United States Patent [19]

Finsterwalder

[11] Patent Number: 4,871,132

[45] Date of Patent: Oct. 3, 1989

[54] AERODYNAMIC STRUCTURAL PIPE FOR HANG GLIDERS

[76] Inventor: Thomas Finsterwalder, Pagodenburgstrasse 8, 8000 Munchen 60, Fed. Rep. of Germany

[21] Appl. No.: 287,572

[22] Filed: Dec. 16, 1988

Related U.S. Application Data

[63] Continuation of Ser. No. 67,807, Jun. 26, 1987, abandoned.

[30] Foreign Application Priority Data

Sep. 9, 1986 [FR] France .................. 86 12950

[51] Int. Cl.$^4$ ............................................. B64C 7/00
[52] U.S. Cl. ........................................ 244/130; 244/37; 244/900; 244/123; 114/243; 114/90
[58] Field of Search ................. 214/130, 900, 131, 37; 483/331, 339, 381; 114/243, 90

[56] References Cited

U.S. PATENT DOCUMENTS

| | | | |
|---|---|---|---|
| 3,011,235 | 12/1961 | Pacheco | 403/331 |
| 3,227,398 | 1/1966 | Struble, Jr. | 114/243 |
| 3,241,513 | 3/1966 | Rather et al. | 114/243 |
| 3,352,274 | 11/1967 | Calkins | 114/243 |
| 4,655,155 | 4/1987 | Folb et al. | 114/243 |
| 4,712,500 | 12/1987 | Montandor | 114/90 |
| 4,716,369 | 1/1988 | Pollard | 114/90 |

FOREIGN PATENT DOCUMENTS

| | | |
|---|---|---|
| 2542501 | 4/1977 | Fed. Rep. of Germany . |
| 3309455 | 9/1984 | Fed. Rep. of Germany . |
| 12684 | 3/1919 | United Kingdom . |

Primary Examiner—Galen L. Barefoot
Attorney, Agent, or Firm—Davis, Bujold & Streck

[57] ABSTRACT

The invention provides an aerodynamically profiled structural pipe (1) comprising a supporting pipe (2) and a rear tapered part (3) of soft material. The tapered part (3) has on both sides beads (15) forced into and captively held by rearwardly open chambers (12) of the supporting pipe (2).

9 Claims, 1 Drawing Sheet

FIG. 1
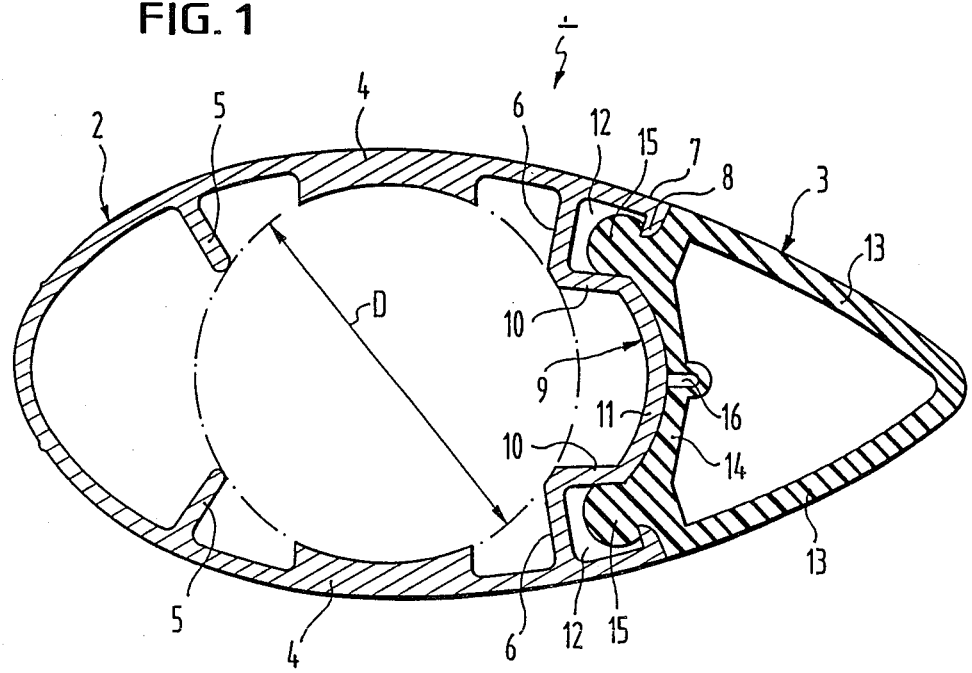
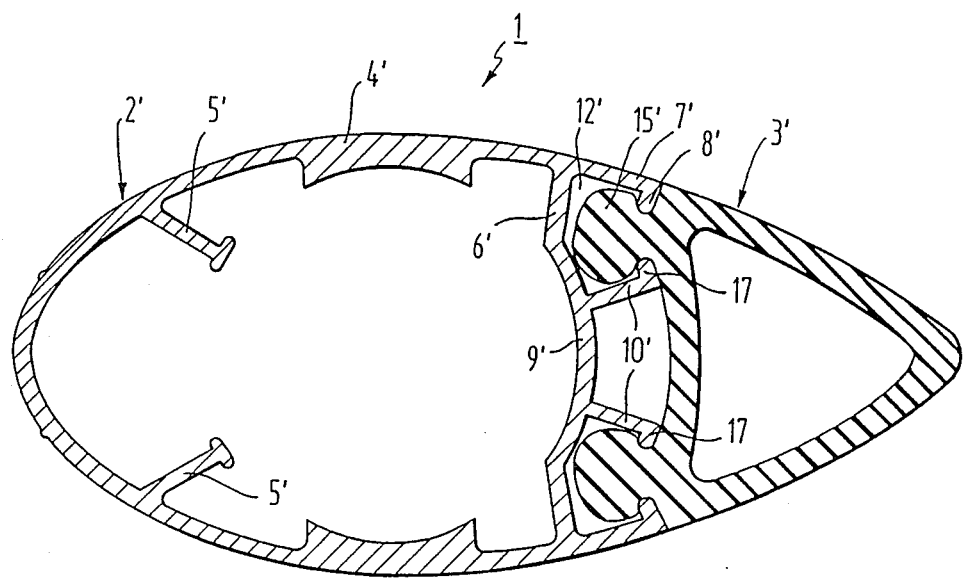
FIG. 2

AERODYNAMIC STRUCTURAL PIPE FOR HANG GLIDERS

This is a continuation of co-pending application Ser. No. 07/067,807 filed on June 26, 1987.

The invention relates to an aerodynamically profiled structural pipe having a profile of tear-shaped cross section for hanging gliders and the like.

Such a structural pipe has been disclosed in the Applicant's West German Patent 33 09 455. Said structural pipe is preferably used for pipes situated in the area of the pilot, thus, for instance, for control straps and trapezoidal pipes of an aerodyne or light plane. In this already known structural pipe, the rear tapered part is of an elastic soft material such as rubber. This structural pipe offers good aerodynamic properties. Due to the elasticity of the soft material, the pilot can effectively grasp the structural pipe with his hands or push with his shoulders without being hurt when pushing an aerodyne. The structural pipe also reduces the risk of damage to the pilot, especially when landing, since here the pilot strikes with his shoulders only against the rear tapered part of soft material.

Such structural pipes have proved satisfactory in the practice.

In the already known structural pipes there is adhered to the supporting pipe, for instance, a strap of soft material of substantially triangular cross section so that there results in a body the pipe profile of tear-shaped cross section.

An object of the present invention is to provide a structural pipe profiled so as to make easier the connection between the supporting pipe and the tapered part of soft material.

For this purpose the supporting pipe is shaped in the rear area facing the tapered part of soft material in a manner such that there results on both sides rearwardly facing partially open chambers of substantially rectangular cross section. Beads of the tapered part can be fastened to these chambers and secured there by claws.

The tapered part of soft material can thus be easily and captively engaged in the chambers and gluing to the supporting pipe is no longer necessary. Together with the simpler connection between the supporting pipe and tapered part, there is also the advantage that the tapered part can be easily replaced after wear and tear.

The invention will be explained in more detail, by way of example, with reference to the drawings in which FIGS. 1 and 2 each show a cross section through a different embodiment of a structural pipe according to the invention.

The structural pipe 1 according to FIG. 1 comprises a supporting pipe 2 made of aluminum, and a strip 3 of soft material that forms the rear part of the structural pipe having an altogether tear-shaped cross section. The supporting pipe 2 has an inside diameter D. In this inside diameter connecting pieces of circular cross section can be inserted and connected with the supporting pipe 2. For a reliable connection the supporting pipe 2 is provided in the central area with reinforcing ribs 4 the inner section of which is adapted to the diameter D. There are further provided in the forward and rear areas of the supporting pipe 2 narrow reinforcing ribs 5 or 6 that extend from the outer section of the supporting pipe 2 to the diameter D. The reinforcing ribs 4, 5 and 6 ensure a high bending strength of the supporting pipe.

Attached to the rear reinforcing ribs 6 there are provided, at both sides of the supporting pipe 2, strips 7 are situated in the surface section of the structural pipe 1. Strips 7 are each provided at their rear end with an inwardly directed claw strip 8.

The ends of the two opposite reinforcement ribs 6 that extend to the inside diameter D are connected by profile 9 that extends rearwardly from the inside diameter. Profile 9 defines two sides 10 extending rearwardly substantially parallel to strips 7. Connecting the sides 10 is a contact surface 11 of part circular cross-section to engage a tapered strip 3. The strips 7 with the claw strips 8, the rear reinforcing ribs 6 and the sides 10 of the profile 9 form two rearwardly partly open chambers 12 of substantially rectangular cross-section. A trapezoidal cross-section is an obvious alternative.

The tapered strip is a hollow section having two sidewalls 13 continuing the surface shape of the structural pipe 1, a contact area 14 for abutting on the contact surface 11 of the profile 9 and two beads 15 in the connecting area between the sides 13 and the contact area 14.

To connect the tapered strip 3 with the supporting pipe 2, the beads 15 are forced into the chambers 12 and secured there by the claw strips 8. The beads 15 are here elastically deformed by the claw strips 8; no special adaptation of the shape of the beads to the claw strips is needed. The beads 15 is forced into the chambers 12 more or less fill said chambers.

Within the contact area 14 of the tapered strip 3 there is provided also an expansion joint or a notch 16 whereby it is ensured that, independently of the production tolerances of the tapered strip, the latter abuts in this area intimately on the contact surface 11 of the profile 9.

In FIG. 2 is shown another embodiment of a structural pipe 1'. The structural pipe is, like in the preceding embodiment, composed of a supporting pipe 2' and a tapered strip 3' of soft material so that the whole structural pipe has a tear-shaped profile. There are laterally provided on the supporting pipe 2' thick reinforcing ribs 4', there are further provided before and after said reinforcing ribs 4' inwardly directed thin reinforcing ribs 5' and 6'. On both sides in the profile of the supporting pipe 2' there are attached to the reinforcing ribs 6' strips 7' provided at their rearward ends with claws 8'. The inwardly directed thin reinforcing ribs 6' at both sides of the supporting pipe are connected by a profile 9'. From this profile depart substantially rearwardly directed strips 10' having claws 17 and being opposite to the strips 7' so that between the parts 6', 7' and 8' and 10' and 17 at both sides of the supporting pipe there results in rearwardly facing partly open chamber 12' of substantially trapezoidal shape. Into this chamber are forced beads 15' of the tapered part 3' of soft material which are secured by the claws 8' and 17.

I claim:

1. An aerodynamically profiled structural pipe having a tear-shaped cross-sectional profile for hang gliders comprising a supporting pipe (2) and a part (3) of elastic soft material, having a substantially triangular crosssection, accurately connected with said supporting pipe and forming the rear part of said structural pipe, wherein said supporting pipe (2) has reinforcing elements (4, 5, 6, 9) extend inwardly from the profile of said structural pipe to define an inside diameter (D) for inserting connecting pieces of circular cross-section and further has, in an area adjacent said part (3), two strips (7) situated on opposite sides and forming part of the profile of said structural pipe (1), said strips (7) having inwardly directed claws (8), said reinforcing elements comprising, in an area adjacent said strips (7), ribs (6, 9) to define with said strips (7) and said claws (8) rearwardly facing partly open chambers (12), and said part (3) of elastic soft material has beads (15) which can be forced into said chambers (12) and captively secured therein by said claws (8).

2. A structural pipe according to claim 1, wherein said chambers (12) are substantially rectangular.

3. A structural pipe according to claim 1 wherein rear ends of said side (10) are interconnected by a profile (9).

4. A structural pipe according to claim 1, wherein said ribs (6') inwardly directed from said profile of said supporting pipe are interconnected by a profile (9).

5. A structural pipe according to claim 1, wherein said claws (8) are claw strips.

6. A structural pipe according to claim 1, wherein said part (3) is a hollow strip of elastic soft material.

7. A structural pipe according to claim 1, wherein said supporting pipe (2) is a one-chamber pipe with defining a circular inside diameter (D).

8. A structural pipe according to claim 7, wherein said supporting pipe (2) has a plurality reinforcing ribs (4, 5, 6) extending to said inside diameter (D).

9. A structural pipe according to claim 7, wherein there are provided in forward and rear areas of said supporting pipe (2) narrow reinforcing ribs (5, 6) and in the central area of said supporting pipe (2) wide reinforcing ribs (4).

* * * * *